United States Patent [19]
Weischedel

[11] 4,321,526
[45] Mar. 23, 1982

[54] RIPPLE CURRENT STABILIZED CONTROL LOOP FOR SWITCHING REGULATOR

[75] Inventor: Richard C. Weischedel, Camillus, N.Y.

[73] Assignee: General Electric Company, Syracuse, N.Y.

[21] Appl. No.: 186,086

[22] Filed: Sep. 11, 1980

[51] Int. Cl.³ ............................................... G05F 1/46
[52] U.S. Cl. ...................................... 323/286; 323/284
[58] Field of Search ............... 323/282, 284, 285, 286, 323/287; 363/18–21

[56] References Cited

U.S. PATENT DOCUMENTS

| | | | |
|---|---|---|---|
| 3,226,630 | 12/1965 | Lampke | 323/282 |
| 3,350,628 | 10/1967 | Gallaher et al. | 323/25 |
| 3,772,588 | 11/1973 | Kelly et al. | 323/285 |
| 3,978,393 | 8/1976 | Wisner et al. | 363/19 X |
| 4,048,665 | 9/1977 | Lia et al. | 323/284 X |

*Primary Examiner*—William M. Shoop
*Assistant Examiner*—Peter S. Wong
*Attorney, Agent, or Firm*—Carl W. Baker; Richard V. Lang

[57] ABSTRACT

A free-running switching regulator of the type including a transistor switch serially-connected between a voltage source and a load is disclosed. The duty cycle of the switch is varied in response to changes in the load voltage to maintain it at a predetermined regulated magnitude. Feedback means is provided for controlling the switching frequency and the duty cycle of the switch substantially independently of the load impedance such that feedback loop stability is maintained irrespective of the load reactance and an essentially constant switching period of duration T is maintained despite changes in the load resistance.

3 Claims, 3 Drawing Figures

RIPPLE CURRENT STABILIZED CONTROL LOOP FOR SWITCHING REGULATOR

The Government has rights in this invention pursuant to Contract N00024-79-C-6026 awarded by the Department of the Navy.

BACKGROUND OF THE INVENTION

1. Field of the Invention

This invention relates to switching regulators, and in particular to the stabilization of free-running switching regulators.

2. Description of the Prior Art

A typical free-running switching regulator such as that illustrated in FIG. 2 of U.S. Pat. No. 3,978,393, includes a transistor switch and an inductor which are connected between an unregulated DC source and a load. A filter capacitor is generally connected across output terminals of the regulator placing it in parallel with the load. The transistor switch is toggled at a relatively high rate (e.g. 10–20 KHz) by a voltage comparator which compares the load voltage to a desired regulated voltage of predetermined magnitude. The comparator maintains the load voltage at the regulated magnitude by controlling the duty cycle of the switch. For example, if the load voltage tends to rise, the duty cycle of the switch is decreased so that less current is delivered to the load during each cycle.

By using such switching regulators to supply power to loads voltage regulation can be effected over a wide range of loads at high efficiency. This high efficiency results because the transistor switch is either fully on or off, except for short transition periods between these two states, and relatively little power is dissipated thereby. Unfortunately, in conventional regulators of this type, stability of the switching frequency and of the feedback loop by which the comparator monitors the load voltage are dependent on the load impedance which typically varies widely. The resulting instabilities can best be understood by separately considering the effects of changes in the resistive and the reactive components of the load impedance.

The resistive component, hereinafter referred to as load resistance, includes the resistance of the load itself, the resistance of wiring connecting the load to the regulator and an equivalent series resistance (ESR) of the filter capacitor which is effectively in parallel with the former two resistances. During constant load operation the transistor switch is alternately closed (turned on) and opened (turned off) at a constant switching frequency. While the switch is closed the voltage differential across the inductor causes the current passing through the load resistance to increase at a constant rate $(di/dt)_{ON}$ from a magnitude slightly below the DC level of the load current to a magnitude slightly above the DC level, where the voltage developed across the load resistance reaches a predetermined upper limit causing the comparator to open the switch. While the switch is open the voltage differential across the inductor causes the current passing through the load resistance to decrease at a constant rate $(di/dt)_{OFF}$ to the magnitude slightly below the DC level, where the voltage developed across the load resistance reaches a predetermined lower limit causing the comparator to again close the switch.

The rate of change of the voltage developed across the load resistance is dependent on both the rate of change of the current passing therethrough and on the magnitude of the load resistance itself. As long as this resistance remains constant, the rate of change of this voltage also remains constant and the comparator continues to toggle the switch at a constant rate. If the load resistance changes, however, the corresponding rate of change of the load voltage causes the switching frequency to change. Such changes in load resistance are caused not only by changes in the resistance of the load itself, but also by variations in the ESR of the filter capacitor. The ESR of aluminum electrolytic capacitors typically used for filter capacitors varies substantially with temperature.

Changes in switching frequency are undesirable because the regulator is designed to operate most efficiently at a nominal frequency. If this frequency is substantially exceeded the power dissipated by the switching transistor during the transitions between the on and off states increases causing inefficient regulator operation and possibly causing destruction of the transistor.

The reactive component of the load impedance, hereinafter referred to as load reactance, includes the reactance of the load itself, the filter capacitance and the lumped reactance of wiring connecting the load to the regulator. Because these reactances are in the feedback loop, they cause phase shifts of the feedback voltage. If the load reactance is increased to a magnitude which is sufficient to cause a substantial phase shift, feedback loop instability can occur causing the comparator to toggle the switch out of phase with variations in the load voltage.

SUMMARY OF THE INVENTION

It is an object of the invention to provide a free-running switching regulator which operates at a constant switching frequency despite changes in load resistance.

It is another object of the invention to provide such a regulator wherein feedback loop stability is maintained irrespective of the magnitude of the load reactance.

These and other objects of the invention have been accomplished by providing a regulator which operates substantially independently of the load impedance. As in the conventional regulator a transistor switch and an inductor are serially connected between a voltage source and a load. A feedback voltage having both an AC component and a DC component is applied to a comparator which controls the switching period T and the duty cycle of the switch. The AC component is developed by coupling a voltage representative of the ripple current passing through a resistor in series with the load to the comparator. The DC component is developed by RC coupling the load voltage to the comparator. The RC time constant is made much larger than T so that the change in the DC component during each switching period is much smaller than the change in the AC component. Thus the switching period duration T and the duty cycle are determined primarily by the rates of change of the ripple current which are held essentially constant at $(di/dt)_{ON}$ and $(di/dt)_{OFF}$ by the inductor. Also, because the comparator controls the switch primarily in response to the AC voltage developed across the resistor, which is necessarily in phase with the load current, feedback loop stability is maintained.

DESCRIPTION OF THE PREFERRED EMBODIMENT

Figure 1:
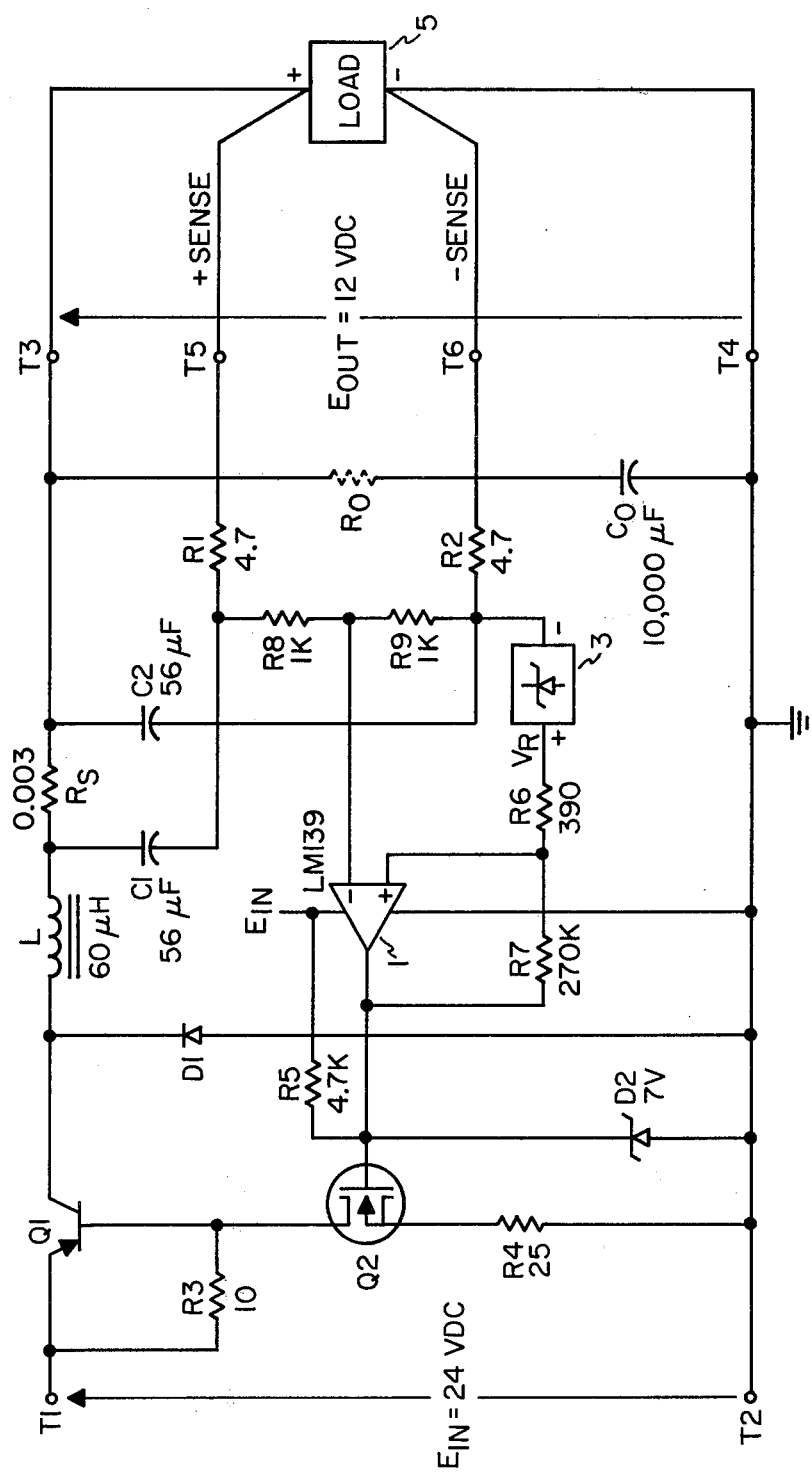
FIG. 1 is a schematic illustration of one embodiment of a switching regulator constructed in accordance with the present invention.

The switching regulator of the present invention is illustrated, in one form thereof, in FIG. 1. As in conventional regulators a transistor switch Q1 and an inductor L are serially connected between an unregulated DC source (not shown) of an input voltage $E_{IN}$, connected to input terminals T1, T2, and a load connected to output terminals T3, T4 at which a regulated output voltage $E_{OUT}$ is provided. A capacitor $C_o$ is connected across terminals T3, T4 to form, in conjunction with the inductor L, an output filter for preventing switching frequency ripple from appearing in the output voltage $E_{OUT}$. The equivalent series resistance of this capacitor is shown as a resistor $R_o$. A diode D1 is provided, as is known in the art, to enable the continuation of current flow through the inductor L when the switch Q1 is open. A resistor R3 is also provided to ensure rapid turn off of Q1 when it is switched from the on to the off state.

In accordance with the invention, the portions of each switching period during which switch Q1 is closed and open are controlled by a voltage comparator 1. The output of the comparator is connected to the switch Q1 by means of its connection to the gate of a driving FET Q2 which is connected in series with a bias resistor R4 between the base of switch Q1 and input terminal T2. The comparator produces a high level voltage turning Q2 on and thus causing switch Q1 to close when a voltage applied to a positive input of the comparator is larger than a voltage applied to a negative input thereof. Conversely, the comparator produces a low level voltage, turning Q2 off and thus causing switch Q1 to open when the voltage applied to the negative input is larger than the voltage applied to the positive input.

The magnitudes of the high level and low level voltages are chosen to effectively turn Q2 on and off, respectively. In the exemplary circuit of FIG. 1 the comparator produces the high level voltage by opening a transistor switch in its output and thus causing the output to rise to a +7 VDC level provided by a zener diode circuit comprising a 7 volt zener diode D2 and a resistor R5. The comparator produces a low level voltage near 0 VDC by closing the switch in its output and connecting the output to ground potential through wiring electrically connecting the comparator to a ground line.

The voltages applied to the comparator's inputs are determined, in part, by the voltages at the positive and negative terminal of the load. These load terminals are connected through non-load current carrying positive and negative sense lines to regulator terminals T5 and T6, respectively. The sense lines are provided to enable the regulator to accurately monitor the load voltage irrespective of IR drops in power lines connecting the load to terminals T3 and T4. If these IR drops are insignificant, because of short power lines or low load current levels, the sense lines can be eliminated and terminals T5 and T6 can be connected to terminals T3 and T4, respectively.

A reference voltage source 3 produces, at a positive output terminal thereof, a reference voltage $V_R$ representative of the regulated load voltage desired. This voltage is always $V_R$ volts larger than the actual voltage at the load's negative, power return terminal because a negative input terminal of the source 3 is connected, through a small resistance R2, to the negative sense terminal T6. Typically, the reference voltage source comprises a zener diode circuit. The reference voltage $V_R$ produced thereby has a magnitude equal to the nominal DC magnitude of the voltage applied to the comparator's negative input. As will be explained, this DC magnitude represents the actual DC load voltage.

The comparator's positive input is connected to the positive terminal of the reference voltage source 3 through a resistor R6. This input is also connected to the comparator's output through a resistor R7, having a much greater magnitude than R6. These resistors function as a voltage divider causing the voltage at the positive input of the comparator to fall between the comparator's output voltage and $V_R$. Because R7 has a much greater magnitude than R6, the comparator output voltage has only a slight influence on the voltage at the positive input. The voltage at the input increases by a few millivolts to a voltage $V_R+$ when the comparator is producing its high level voltage causing the switch to remain closed and it decreases by a few millivolts to a voltage $V_R-$ when the comparator is producing its low level voltage causing the switch to remain open. The voltages $V_R+$ and $V_R-$ are threshold voltages which establish the upper and lower limits of the voltage which must be equaled by the voltage applied to the comparator's negative input before the comparator will switch between its low and high level outputs. This voltage differential between $V_R+$ and $V_R-$ causes the comparator to operate with a predefined hysteresis.

The voltage applied to the negative input of the comparator is a feedback voltage developed by the regulator feedback loop. It is applied through a voltage divider comprising resistors R8 and R9. This feedback voltage includes both an AC component and a DC component. The AC component of the feedback voltage, developed across a resistor $R_S$ which is serially connected with the inductor and the load, represents the ripple in the load current. The resistance of $R_S$ is small with respect to the minimum load resistance to prevent undue power dissipation in $R_S$. The AC component is coupled to opposite ends of the R8, R9 voltage divider through capacitors C1 and C2 connected to opposite ends of resistor $R_S$.

The DC component of the feedback voltage, which represents the DC level of the load voltage, is coupled to opposite ends of the voltage divider R8, R9 from terminals T5 and T6 to which the positive and negative sense lines are connected. The voltage on the load's positive, power application terminal is coupled to one end of the voltage divider through a resistor R1 which, in combination with C1, forms an RC circuit having a time constant which is much larger than the switching period T. Similarly, the voltage on the negative terminal of the load is coupled to the other end of the voltage divider through a resistor R2, which, together with C2, forms an RC circuit having the same time constant as R1, C1. In the exemplary embodiment the ratio of the RC time constant to the period T is approximately 5:1, but this ratio can be higher or lower depending on the desired rate of response of the regulator to load changes.

The resistances of resistors R8 and R9 are chosen such that the DC voltage level applied to the negative input of the comparator 1 is equal to the voltage $V_R$ when the load voltage is equal to the regulated voltage which the regulator is designed to maintain. In the exemplary circuit of FIG. 1, $E_{OUT} = 12$ VDC, $R8 = R9 = 1K\Omega$, $V_R = 6$ VDC.

The RC time constant established by R1, C1 and R2, C2 is made large with respect to the desired switching period T of the regulator to enable these RC circuits to perform two functions. First, they prevent any ripple or high frequency noise in the load voltage from appearing in the DC component of the feedback voltage. Second, they delay feedback of variations in the load voltage so that increases and decreases in the DC component voltage level in response to load voltage increases and decreases occur slowly with respect to the period T and are small with respect to the change in the amplitude of the AC component during each period. Thus, the rate at which the comparator toggles the switch Q1 is determined primarily by the AC voltage developed across $R_S$.

Because this AC voltage has a much greater influence on the switching rate than the DC component of the feedback voltage representing the load voltage, the switching period is determined substantially independently of the load impedance. Feedback loop stability is maintained despite phase shifts of the load voltage caused by changes in the reactive component of the load impedance and the switching period T is maintained essentially constant despite changes in the resistive component of the load impedance. The AC voltage developed by resistor $R_S$ establishes a relatively constant switching period T because the rates of increase and decrease of the ripple current represented thereby, during the closed and open states of the switch Q1, are held constant by the inductor L which maintains the rate of change of current therethrough relatively constant.

Figure 2A:
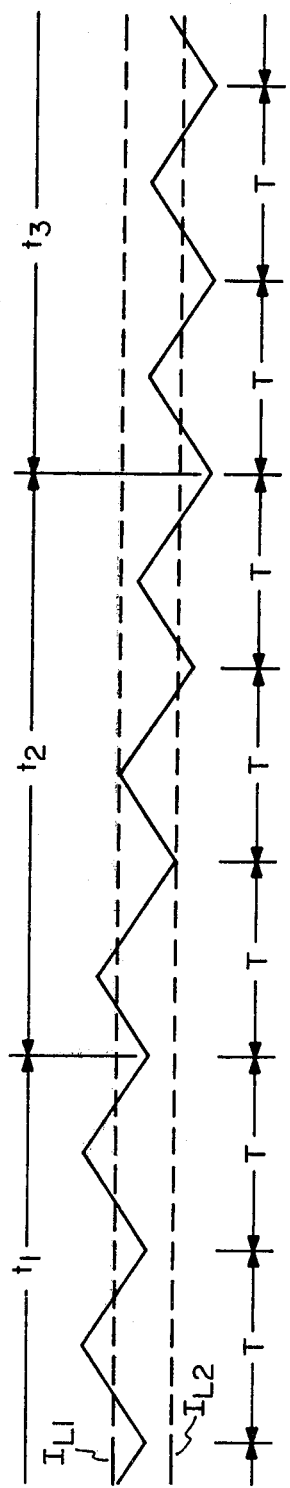
FIGS. 2A and 2B are schematic illustrations of the waveshapes of signals produced by the switching regulator of FIG. 1.
Figure 2B:
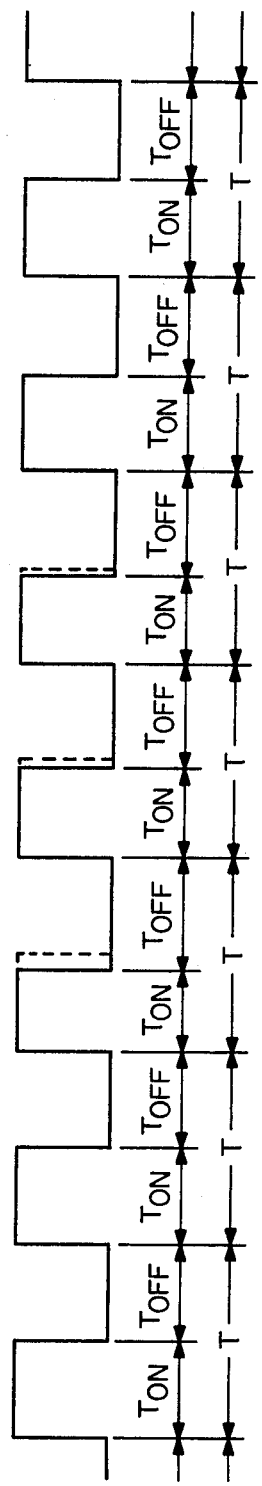

FIGS. 2A and 2B illustrate typical waveforms for the load current and the comparator output, respectively, during three successive time intervals $t_1$, $t_2$, $t_3$ when differing load conditions exist. During interval $t_1$ the load impedance is stable at a first magnitude $Z_1$ and the load ripple current varies above and below a DC level $I_{L1}$ at the rates determined by the inductor L. The DC component of the feedback voltage at the negative input of the comparator 1 remains constant at $V_R$ and the rate of change of the feedback voltage is determined entirely by the AC component representing the ripple in the load current. Thus a portion $T_{ON}$ of each period T, during which the comparator keeps the switch Q1 closed as the feedback voltage is increasing from $V_R^-$ to $V_R^+$, is determined solely by the rate of increase of the load ripple current. This rate of increase $(di/dt)_{ON}$ is equal to $V_{ON}/L$, where $V_{ON}$ is the voltage across the inductor L while the switch is closed. Correspondingly, the remaining portion $T_{OFF}$ of each period T, during which the comparator keeps the switch open as the feedback voltage is decreasing from $V_R^+$ to $V^{R-}$, is determined solely by the rate of decrease of the load current $(di/dt)_{OFF} = V_{OFF}/L$, where $V_{OFF}$ is the voltage across the inductor when the switch is open. For the illustrated embodiment the magnitudes of the voltages $V_{ON}$ and $V_{OFF}$ are both equal to about 12 VDC and the times $T_{ON}$ and $T_{OFF}$ are both approximately equal to 0.025 milliseconds, establishing a symmetrical comparator output waveform (FIG. 2B). The switching frequency 1/T during $t_1$ is thus approximately equal to 20 KHz. This frequency is high enough to enable the use of output filter components (L, $C_o$) of relatively small size, but not so high as to increase the power dissipation in the switching transistor to its limit. This power dissipation can be reduced and the frequency further increased by utilizing a switching transistor having shorter transient times between the on and off states.

At the beginning of interval $t_2$ an increase in load impedance from $Z_1$ to $Z_2$ is experienced causing a momentary increase in the DC level of the load voltage above the regulated magnitude (12 VDC). During this interval the regulator returns the load voltage to the regulated magnitude by decreasing the DC level of the load current from $I_{L1}$ to $I_{L2}$ as will be explained.

When the momentary increase in load voltage is experienced it is coupled to the negative input of the comparator, as the DC component of the feedback voltage, through the delay of the RC circuits R1C1, R2C2. Because of the long time constant of these circuits the rate of increase of the DC component, in response to the increase in the load voltage, is much slower than the rate of increase of the AC component which increases at the constant rate $R_S (di/dt)_{ON}$. Nevertheless, the slowly increasing DC component causes the feedback voltage to increase to the upper threshold voltage $V_R^+$ more rapidly than it does when the rate of increase is determined solely by the AC component. Thus the portion $T_{ON}$ of the first switching period in interval $t_2$, during which the comparator keeps the switch Q1 closed as the feedback voltage is increasing from $V_R^-$ to $V_R^+$, is shorter than it was during $t_1$ (see FIG. 2B) and the first peak of the load ripple current occurring in $t_2$ is lower than the current peaks during $t_1$ (see FIG. 2A). The dashed lines in FIG. 2B illustrate the comparator output waveform that would have been produced if no load impedance change was experienced.

After the feedback voltage reaches the upper threshold $V_R^+$ and the switch Q1 is opened by the comparator the AC component decreases at the constant rate $R_S (di/dt)_{OFF}$. The DC component continues to increase at a slow rate, however, because the load voltage is still above $V_R$. The slowly increasing DC component causes the feedback voltage to decrease to the lower threshold voltage $V_R^-$ more slowly than it does when the rate of decrease is determined solely by the AC component. Thus the portion $T_{OFF}$ of the first switching period in interval $t_2$, during which the comparator keeps the switch Q1 open as the feedback voltage is decreasing from $V_R^+$ to $V_R^-$, is longer than it was during $t_1$ and the first valley of the load ripple current occurring in $t_2$ is lower than the current valleys during $t_1$.

At the end of the first switching period in interval $t_2$ the DC level of the load voltage has been reduced because the DC level of the load current has been decreased by decreasing the peak and valley amplitudes of the current. Nevertheless, the load voltage is still above the regulated voltage level and the DC component of the feedback voltage continues to increase. Because of the reduced load voltage, the rate of increase of the DC component is slower during the second period in $t_2$ and this component has less influence on the rate of change of the feedback voltage than it did during the first period in $t_2$. Thus the rate of increase of the feedback voltage is not as rapid as it was in the previous period and the rate of decrease is not as slow as it was. The time $T_{ON}$ is still shorter than it was in the interval $t_1$ and the time $T_{OFF}$ is still longer, however, and thus the DC level of the load current is further decreased causing the DC level of the load voltage to be reduced to a magnitude approaching the regulated voltage.

During the third switching period in interval $t_2$, where the rate of increase of the feedback voltage is even less rapid than it was in the second period of $t_2$, the times $T_{ON}$ and $T_{OFF}$ are almost equal to what they were during the interval $t_1$. A final decrease in the load current to the DC level $I_{L2}$ is brought about during this third period causing the DC level of the load voltage to be reduced to the regulated magnitude.

During interval $t_3$ the regulator resumes operation as in interval $t_1$ with the only difference being the new load current level $I_{L2}$. Once again $T_{ON}$ and $T_{OFF}$ remain constant with the sum thereof being equal to the switching period T. It should be noted that the sum of the times $T_{ON}$ and $T_{OFF}$ during each switching period in interval $t_2$ is also approximately equal to T even though the times $T_{ON}$ and $T_{OFF}$ vary during this interval. This results because the magnitude of the decrease in $T_{ON}$ during each period is approximately equal to the magnitude of the increase in $T_{OFF}$ during the same period.

Thus a free-running switching regulator has been provided which operates at an essentially constant switching frequency even during variations in the load resistance. The regulator also has high feedback loop stability irrespective of the load reactance, because the times at which the switch is turned on and off are determined primarily by the ripple voltage developed across the resistor $R_S$ in the regulator. Feedback delays caused by the reactance in the wiring connecting the load to the regulator and in the load itself have only a secondary effect on switch control and remote sensing can be utilized to regulate loads located at greater distances than has been possible with prior art switching regulators.

Although a specific embodiment of the present invention has been disclosed, it is to be understood that it is only illustrative and the scope of the invention is to be determined from the appended claims.

I claim:

1. In a switching regulator including a switch and an inductor serially connected between a voltage source and a load, the duty cycle of said switch being varied in response to changes in the load voltage to maintain said voltage at a predetermined magnitude, means for controlling the switching frequency and the duty cycle of said switch substantially independently of the load impedance such that feedback loop stability is maintained irrespective of the load reactance and an essentially constant switching period of duration T is maintained despite changes in the load resistance, said means comprising:

(a) a voltage comparator having first and second inputs and having an output electrically connected to the switch, said comparator effecting closing of the switch when a voltage applied to the first input is larger than a voltage applied to the second input and effecting opening of the switch when the voltage applied to the second input is larger than the voltage applied to the first input;

(b) a voltage reference source for applying a voltage $V_R$, representative of the predetermined load voltage, to the first input of the comparator;

(c) means electrically connected to the first input of the comparator for increasing the voltage on the first input above $V_R$, to $V_R^+$, when the switch is closed and for decreasing the voltage on the input below $V_R$, to $V_R^-$, when the switch is open, the difference $V_R^+ - V_R^-$, being much smaller than $V_R$;

(d) a resistor connected in series with the load for producing a voltage representative of the load current;

(e) means for coupling a voltage representative of the ripple current passing through the resistor to the second input of the comparator as an AC component of the voltage applied thereto; and (f) RC circuitry for coupling the load voltage to the second input of the comparator as a DC component of the voltage applied thereto;

the time constant of said RC circuitry being much larger than T so that the change in the DC component during each switching period is much smaller than the change in the AC component, the switching period duration T and duty cycle thus being determined primarily by the rate of change of the ripple current, said rate of change being held essentially constant by the inductor.

2. In a switching regulator including a transistor switch and an inductor serially connected between a voltage source and a load, the duty cycle of said switch being varied in response to changes in the load voltage to maintain said voltage at a predetermined magnitude, means for controlling the switching frequency and the duty cycle of said switch substantially independently of the load impedance such that feedback loop stability is maintained irrespective of the load reactance and an essentially constant switching period of duration T is maintained despite changes in the load resistance, said means comprising:

(a) a voltage comparator having first and second inputs and having an output electrically connected to the switch, said comparator effecting closing of the switch when a voltage applied to the first input is larger than a voltage applied to the second input and effecting opening of the switch when the voltage applied to the second input is larger than the voltage applied to the first input;

(b) a voltage reference source having an input and an output, said reference source producing at the output a reference voltage $V_R$ representative of the predetermined load voltage;

(c) a voltage divider comprising a resistor electrically connected between the comparator's output and its first input, and a resistor connected between said first input and the voltage reference source's output, said voltage divider applying a voltage $V_R^+$ to the first input when the switch is held closed by the comparator and applying a voltage $V_R^-$ to the first input when the switch is held open by the comparator, the voltage $V_R^+$ being larger than $V_R$, the voltage $V_R^-$ being smaller than $V_R$ and the difference $V_R^+ - V_R^-$ being much smaller than $V_R$;

(d) a resistor serially-connected between the inductor and the load for producing a voltage representative of the load current;

(e) means for coupling a voltage representative of the ripple current passing through the resistor to the second input of the comparator as an AC component of the voltage applied thereto, said means comprising a first capacitor electrically connected between the inductor-connected side of the resistor and said second input and a second capacitor electrically-connected between the load-connected side of the resistor and the input of the voltage reference source; and (f) RC circuitry for coupling the load voltage to the second input of the comparator as a DC component of the voltage applied thereto, said circuitry including a first resistor electrically-connected between the power application side of the load and the comparator's second input for forming, together with the first capacitor, a first RC circuit, and further including a second resistor electrically-connected between the power return side of the load and the input of the voltage reference source for forming, together with the second capacitor, a second RC circuit, the time constant of said RC circuitry being much larger than T so that the change in the DC component during each switching period is much smaller than the change in the AC component, the switching period duration T and duty cycle thus being determined primarily by the rate of change of the ripple current, said rate of change being held essentially constant by the inductor.

3. In a switching regulator including a switch and an inductor serially connected between a voltage source and a load, the duty cycle of said switch being varied in response to changes in the load voltage to maintain said voltage at a predetermined magnitude, means for controlling the switching frequency and the duty cycle of said switch substantially independently of the load impedance such that feedback loop stability is maintained irrespective of the load reactance and an essentially constant switching period of duration T is maintained despite changes in the load resistance, said means comprising;

(a) a voltage comparator having first and second inputs and having an output electrically connected to the switch;

(b) a voltage reference source for applying a voltage $V_R$, representative of the predetermined load voltage, to the first input of the comparator;

(c) means electrically connected to the comparator enabling it to effect closing of the switch when the voltage applied to its second input reaches a lower threshold voltage $V_R^-$ and to effect opening of the switch when the voltage applied to its second input reaches an upper threshold voltage $V_R^+$, where $V_R^+$ and $V_R^-$ are voltages respectively greater and lesser than $V_R$ and the difference $V_R^+ - V_R^-$ is much smaller than $V_R$;

(d) a resistor connected in series with the load for producing a voltage representative of the load current;

(e) means for coupling a voltage representative of the ripple current passing through the resistor to the second input of the comparator as an AC component of the voltage applied thereto; and (f) RC circuitry for coupling the load voltage to the second input of the comparator as a DC component of the voltage applied thereto;

the time constant to said RC circuitry being much larger than T so that the change in the DC component during each switching period is much smaller than the change in the AC component, the switching period duration T and duty cycle thus being determined primarily by the rate of change of the ripple current, said rate of change being held essentially constant by the inductor.

* * * * *